G. M. EATON.
FLEXIBLE GEAR.
APPLICATION FILED FEB. 3, 1916.

1,285,956.

Patented Nov. 26, 1918.

WITNESSES:
R. J. Ridge.
W. B. Wells

INVENTOR
George M. Eaton.
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

FLEXIBLE GEAR.

1,285,956.    Specification of Letters Patent.    Patented Nov. 26, 1918.

Application filed February 3, 1916.   Serial No. 76,025.

*To all whom it may concern:*

Be it known that I, GEORGE M. EATON, a citizen of the United States, and a resident of Pittsburgh, in the county of Allegheny and State of Pennsylvania, have invented a new and useful Improvement in Flexible Gears, of which the following is a specification.

My invention relates to flexible gear wheels and similar driving connections to be interposed between the propelling motors and the driving wheels of electric vehicles.

One object of my invention is to provide a flexible gear wheel which shall be simple to construct and reliable and efficient in operation.

Another object of my invention is to provide a gear wheel embodying a hub member, a rim member and a resilient frictional connection between the hub member and the rim member.

A further object of my invention is to provide a gear wheel of the above indicated character with means for varying the friction between the hub member and the rim member in accordance with the relative rotation therebetween and for establishing a rigid connection between the hub member and the rim member after a limited relative rotative movement between the two members has occurred.

Figure 2:
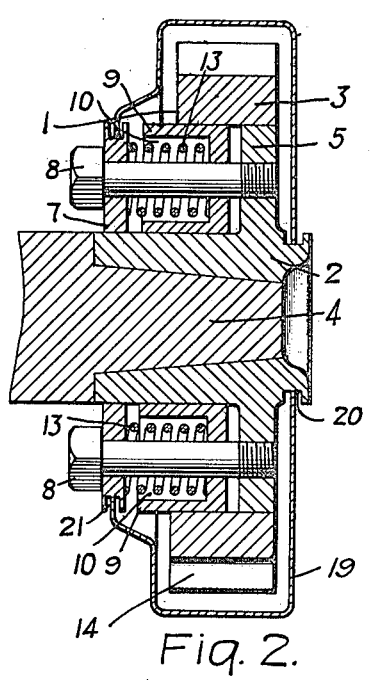
Figure 1:
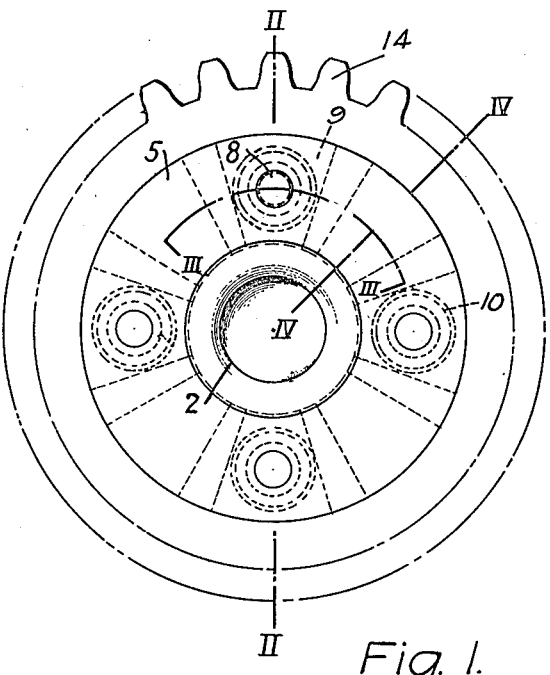
Figure 3:
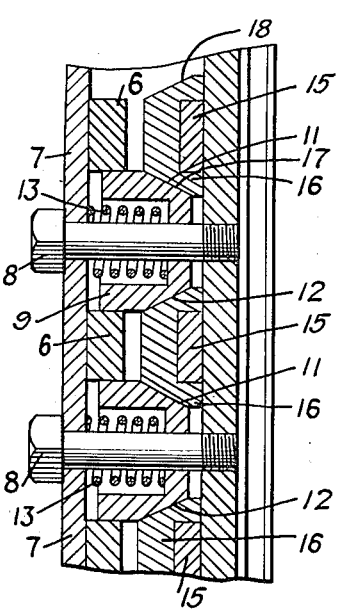
Figure 4:
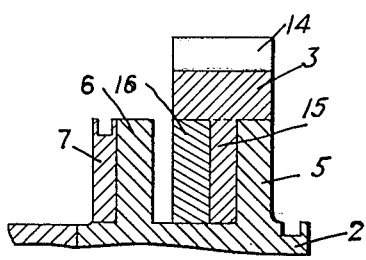

In the accompanying drawing, Figure 1 is a side elevation of a gear wheel constructed in accordance with my invention; Fig. 2 is a sectional view along the line II—II of Fig. 1; Fig. 3 is a section along the line III—III of Fig. 1, and Fig. 4 is a section along the line IV—IV of Fig. 1.

Referring to the drawing, a gear wheel 1, embodying a hub member 2 and a rim member 3, is mounted upon a shaft 4. The hub member 2 is provided with a flange 5 which extends laterally therefrom and a plurality of radial projections 6 disposed at the side of the flange 5. A plurality of bolts 8 are employed to secure a ring 7 to the flange 5 and in contact with the projections 6.

A plurality of wedges 9 are mounted upon the bolts 8 and are disposed between the projections 6 so as to have a limited movement between the ring 7 and the flange 5 parallel to the axis of the gear wheel. Each of the wedges 9 is provided with a cylindrical recess 10 parallel to the axis of the gear wheel and wedging or friction surfaces 11 and 12. The wedging surfaces theoretically should be helicoidal surfaces but plain surfaces may be used. Helical springs 13, which are mounted upon the bolts 8, extend into the recesses 10 of the wedges 9. Each of the springs has one end in engagement with the corresponding wedge 9 and the other end in engagement with the ring 7.

The rim member 3 is provided with gear teeth 14 and a number of inward radial projections 15. Shoes 16, which are mounted upon the projections 15, are provided with wedging or friction surfaces 17 and 18 which are similar to the wedging surfaces 11 and 12 on the wedges 9. A cover or guard 19, which is supported in the channels 20 and 21 of the hub member and the ring 7, respectively, may be provided for preventing the admission of foreign substances to the gear wheel.

The gear wheel above described is composed of two rotatable parts, namely, the hub member having a ring 7, wedges 9, springs 13 and bolts 8, and the rim member 3 having the shoes 16, that have a limited rotational movement relative to each other. In case the rim member 3 is rotated by a motor which may be geared thereto, the motion will be conveyed from the rim member to the hub member by means of the friction engagement of the shoes 16 with the wedges 9. The contact surfaces 11 and 12 of the wedges 9 are maintained in engagement with the surfaces 17 and 18 on the shoes 16 by means of the helical springs 13, and, as the load is applied to the gear wheel, the springs are gradually compressed. Thus, as the springs are compressed, the friction between the surfaces 11 and 12 and 17 and 18 will be gradually increased until the wedges 9 encounter the ring 7, at which point the hub and the rim members are rigidly connected together.

In order to disassemble the gear wheel parts, the bolts 8 are removed and the ring 7, springs 13 and wedges 9 are released and removed from the gear wheel. The rim member 3 is rotatively moved until the projections 15 thereon are opposite the openings between the projections 6 on the hub member. The rim member may then be separated from the hub member, the projections 15 passing through the openings between the projections 6.

It is evident that modifications in the specific structural details may be effected without departing from the spirit and scope of my invention, and I desire, therefore, that only such limitations shall be imposed as are indicated in the appended claims.

I claim as my invention:

1. In a flexible gear wheel, the combination with a hub member, and a rim member surrounding and mounted on said hub member, of a plurality of wedges independently mounted on the hub member, a plurality of wedges associated with the rim member and resilient means for holding said hub wedges in engagement with the rim wedges to resiliently join the hub and rim members.

2. In a flexible gear wheel, the combination with a hub member and a rim member, of resilient frictional means comprising a plurality of independent wedges mounted on the hub member and a plurality of independent wedges associated with the rim member for restraining said rim member from rotative movement relative to said hub member in either direction.

3. In a flexible gear wheel, the combination with a hub member, of a rim member surrounding said hub member, and resilient frictional means for joining said members and for establishing a rigid connection between said members after a limited relative rotative movement therebetween.

4. In a flexible gear wheel, the combination with a hub member, and a rim member surrounding said hub member, of frictional means for restraining said members from rotative movement relative to each other during a limited relative rotative movement between said members and for effecting a rigid connection between said members after a limited relative rotative movement therebetween.

5. In a flexible gear wheel, the combination with a hub member, a rim member surrounding and mounted on said hub member, a plurality of wedges movable axially of the hub and rim members, and springs mounted within said wedges, of means for mounting said wedges upon said hub member so that said springs hold the wedges in frictional engagement with said rim member.

6. In a flexible gear wheel, the combination with a hub member, and a rim member surrounding and mounted on said hub member, of a plurality of wedges associated with said members, helical springs disposed parallel to the axis of the hub member and disposed within the wedges associated with the hub member for maintaining the wedges in engagement with each other to frictionally and resiliently join the hub and the rim members.

7. In a flexible gear wheel, the combination with a hub member having outwardly extending radial projections, and a rim member surrounding said hub member and provided with inward radial projections, said rim member being mounted on said hub member, of resiliently mounted frictional means for joining said hub and rim projections.

8. In a flexible gear wheel, the combination with a hub member having radial projections, and a rim member surrounding said hub member, said rim member provided with inward radial projections, of frictional shoes mounted on said rim projections, a plurality of wedges mounted on said hub member and disposed between the hub projections, and resilient means for varying the frictional pressure between said shoes and said wedges in accordance with the relative rotative movement between said hub and said rim members.

9. In a flexible gear wheel, the combination with a hub member and a rim member surrounding said hub member, of a plurality of shoes mounted on said rim member and provided with wedging surfaces, a plurality of wedges mounted upon said hub member and provided with wedging surfaces adapted to engage the wedging surfaces on said shoes, and resilient means for holding said shoes and said wedges in engagement with each other.

10. In a flexible gear wheel, the combination with a hub member having a plurality of projections and a flange extending therefrom, a rim member surrounding said hub member, said hub member provided with a plurality of inward radial projections disposed between said hub projections and said hub flange, a plurality of shoes mounted on said rim projections, a ring disposed adjacent to said hub projections, and wedges disposed between said hub projections and having wedging surfaces adapted to engage said rim shoes, of means for joining said ring and said wedges to the hub flange, and means disposed between said ring and said wedges for holding the latter in frictional engagement with said shoes.

11. In a flexible gear wheel, the combination with a hub member having a plurality of wedges mounted thereon and a rim member having a plurality of wedges associated therewith, of means comprising a plurality of springs and wedges for resiliently joining said hub and said rim members.

12. In a flexible gear wheel, the combination with a hub member and a rim member, of means for resiliently and frictionally joining the hub and rim members, comprising a plurality of springs, a plurality of wedges mounted on the hub member and a plurality of wedges associated with the rim member.

In testimony whereof, I have hereunto subscribed my name this 28th day of Jan., 1916.

GEORGE M. EATON.